United States Patent
Kwak

(10) Patent No.: US 8,120,459 B2
(45) Date of Patent: Feb. 21, 2012

(54) ACCESS AUTHENTICATION SYSTEM AND METHOD USING SMART COMMUNICATOR

(75) Inventor: Se Jin Kwak, Seoul (KR)

(73) Assignee: Samsung Electronics Co., Ltd (KR)

( * ) Notice: Subject to any disclaimer, the term of this patent is extended or adjusted under 35 U.S.C. 154(b) by 1195 days.

(21) Appl. No.: 11/638,848

(22) Filed: Dec. 14, 2006

(65) Prior Publication Data

US 2007/0216764 A1   Sep. 20, 2007

(30) Foreign Application Priority Data

Jan. 9, 2006   (KR) ........................ 10-2006-0002375

(51) Int. Cl.
   *G05B 19/00*   (2006.01)
(52) U.S. Cl. .................................... 340/5.2; 340/539.14
(58) Field of Classification Search ............. 340/539.16, 340/825, 709, 506, 286.01, 286.02, 286.03, 340/286.06, 5.2, 539.11, 539.14; 379/167.05, 379/167.12

See application file for complete search history.

(56) References Cited

U.S. PATENT DOCUMENTS

| | | | |
|---|---|---|---|
| 5,717,379 A | | 2/1998 | Peters |
| 5,907,352 A | * | 5/1999 | Gilley ........................... 348/151 |
| 6,049,598 A | | 4/2000 | Peters et al. |
| 6,441,734 B1 | * | 8/2002 | Gutta et al. .................... 340/541 |
| 6,720,874 B2 | * | 4/2004 | Fufido et al. .................... 340/541 |
| 6,977,585 B2 | * | 12/2005 | Falk et al. ...................... 340/506 |
| 7,012,503 B2 | * | 3/2006 | Nielsen ........................... 340/5.6 |
| 7,015,943 B2 | * | 3/2006 | Chiang ........................... 348/143 |
| 7,106,176 B2 | * | 9/2006 | La et al. .................... 340/286.01 |
| 7,109,860 B2 | * | 9/2006 | Wang ....................... 340/539.11 |
| 7,114,178 B2 | * | 9/2006 | Dent et al. ......................... 726/6 |
| 7,193,644 B2 | * | 3/2007 | Carter ......................... 348/14.06 |
| 7,315,823 B2 | * | 1/2008 | Brondrup .......................... 705/5 |
| 7,616,091 B2 | * | 11/2009 | Libin ........................... 340/5.28 |
| 2002/0030583 A1 | | 3/2002 | Jang et al. |
| 2002/0118283 A1 | * | 8/2002 | Carretero Guerrero ...... 348/156 |
| 2002/0147982 A1 | * | 10/2002 | Naidoo et al. ................ 725/105 |
| 2002/0183008 A1 | * | 12/2002 | Menard et al. ................... 455/66 |
| 2004/0039909 A1 | * | 2/2004 | Cheng ........................... 713/169 |
| 2005/0113080 A1 | * | 5/2005 | Nishimura .................... 455/420 |
| 2005/0219360 A1 | | 10/2005 | Cusack et al. |

(Continued)

FOREIGN PATENT DOCUMENTS

DE   196 34 778   3/1998

(Continued)

*Primary Examiner* — Daniel Wu
*Assistant Examiner* — Rufus Point
(74) *Attorney, Agent, or Firm* — The Farrell Law Firm, P.C.

(57) ABSTRACT

Disclosed is an intelligent access authentication system and method. The intelligent access authentication system includes a door lock that can be locked and released in a predetermined manner, a door phone for communicating with the visitor; a smart communicator which configures access approval levels of expected visitors and access authentication information for each access approval level, communicates with the visitor, and controls the door lock, and a home network server which stores the access approval levels of expected visitors and access authentication information for each access approval level received from the smart communicator, checks the access approval level of the visitor attempting to release the door lock by referring to previously stored information, and transmits a door lock operating command to the door lock according to the access approval level of the visitor. In the present invention, the resident can check the visitor and control the door lock to be released according to the access approval level of the visitor, even at a remote location.

21 Claims, 10 Drawing Sheets

U.S. PATENT DOCUMENTS

| | | | | |
|---|---|---|---|---|
| 2005/0267605 | A1* | 12/2005 | Lee et al. | 700/19 |
| 2005/0285934 | A1* | 12/2005 | Carter | 348/14.06 |
| 2006/0010199 | A1* | 1/2006 | Brailean et al. | 709/204 |
| 2006/0063517 | A1* | 3/2006 | Oh et al. | 455/415 |
| 2006/0145851 | A1* | 7/2006 | Posamentier | 340/572.1 |
| 2006/0187034 | A1* | 8/2006 | Styers et al. | 340/545.1 |
| 2006/0240824 | A1* | 10/2006 | Henderson et al. | 455/435.1 |
| 2007/0086626 | A1* | 4/2007 | Mariani et al. | 382/115 |
| 2008/0117299 | A1* | 5/2008 | Carter | 348/152 |
| 2009/0051767 | A1* | 2/2009 | Iwamura | 348/143 |

FOREIGN PATENT DOCUMENTS

| | | |
|---|---|---|
| EP | 1 587 293 | 10/2005 |
| GB | 2 402 840 | 12/2004 |

* cited by examiner

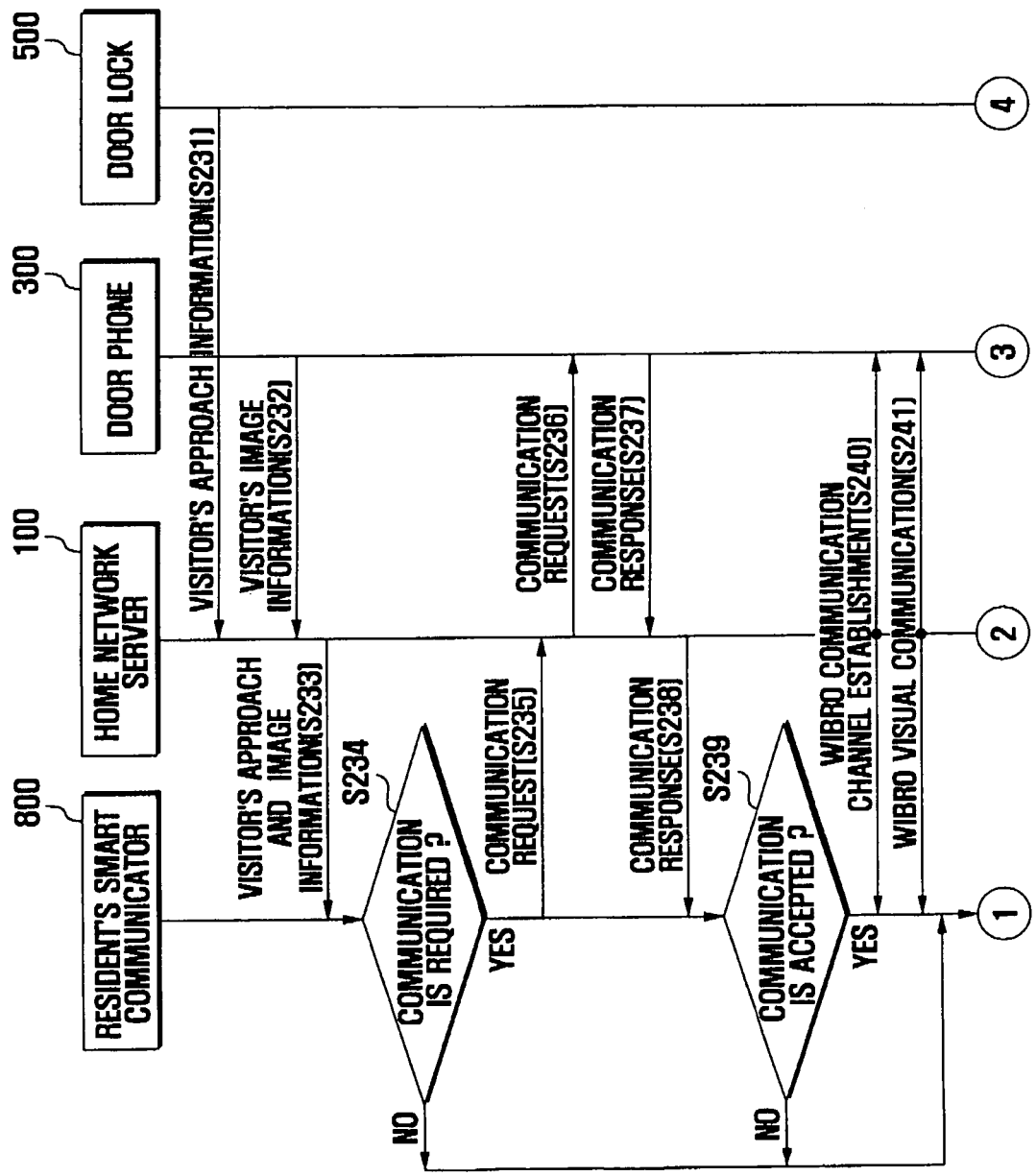

ACCESS AUTHENTICATION SYSTEM AND METHOD USING SMART COMMUNICATOR

PRIORITY

This application claims priority under 35 U.S.C. §119 to an application entitled "ACCESS AUTHENTICATION SYSTEM AND METHOD USING SMART COMMUNICATOR" filed in the Korean Intellectual Property Office on Jan. 9, 2006 and assigned Serial No. 2006-0002375, the contents of which are incorporated herein by reference.

BACKGROUND OF THE INVENTION

1. Field of the Invention

The present invention relates to an intelligent access authentication system and method and, in particular, to an intelligent access authentication system and method using a smart communicator (SC) for allowing an operator to communicate with a visitor and remotely control an entry.

2. Description of the Related Art

As the technologies rapidly developed in various fields, residential and commercial living and working environments. For example, integration of household electronics such as electric appliances, lighting apparatuses, cooling and heating apparatuses, door locks, gas valves, etc., has improved quality of life in many houses.

Home automation is a field specialized in the specific automation requirements of private homes and in the application of automation techniques for enhancing the comfort and security of occupants of these automated homes. For example, home automation can be implemented by remote controlling household appliances, a video door phone system for communicating with a visitor on a video screen, a security mechanism for detecting and alarming intruders, an alarm system for detecting and providing an alarm of gas leakage and fire, and a meter reading mechanism for remotely reading the utilization meters.

FIG. 1 is a block diagram illustrating a video door phone system as a part of the home automation. The user can identify the visitor using the video door phone system.

As shown in FIG. 1, the conventional video door phone system includes a door phone 10 installed outside of the door and a video phone 20 is installed anywhere inside of the home so as to support voice communication. The door phone 10 has a camera 12 for capturing one or more images of the visitor and the video phone 20 has a display 22 for displaying the visitor's image taken by the camera 12 such that the resident and the visitor can communicate using the door phone 10 and video phone 20.

FIG. 2 is a block diagram illustrating a conventional home automation system, in which a home server controls a video door phone system and the electric appliances connected through a home network.

As shown in FIG. 2, the conventional home automation system includes a home server 30 having a display 32 such as a liquid crystal display (LCD) for displaying images from the camera, and equipped with various home automation functions.

The home server 30 can identify the visitor using the voice obtained through the door phone 10 and the image taken by the camera 12. Also the home server 30 is implemented to connect with a wide area network (WAN), which is widely structured computer communication network, such that the electric appliances 40 can be remotely controlled through the WAN. The home server 30 is provided with a storage so as to store and playback the voice and image taken by the camera 12.

In the conventional home automation system, however, the resident cannot remotely communicate with the visitor when he/she is not home.

Also, the conventional home automation system has limited functional capabilities which are basically limited to providing a visitor identification, video phone, home security, and voice and video functions. Additionally, video and voice data can be recorded.

Moreover, although conventional home automation systems provide remote functions that can be accessed using a telephone connector or the Internet to control electric appliances constituting a home network they cannot remotely provide real-time communication a visitor.

Also, the conventional home automation system based on the Internet can control the household appliances and detect dangerous situations such as intrusion, fire, or gas leakage using the remote computer, handheld phone, and other wireless communication terminal that support the Internet connection. However, the conventional home automation system does not support the bidirectional communication between the home server with the remote user such that the user cannot remotely check visitors and/or control door locks and other electronic devices of the home network in bidirectional manner.

SUMMARY OF THE INVENTION

The present invention has been made in an effort to solve the above problems, and it is an object of the present invention to provide an intelligent access authentication system and method allowing a resident to check and communicate with a visitor remotely.

It is another object of the present invention to provide an intelligent access authentication system and method which is capable of authenticating the visitor's access and monitoring the visitor's movements by remotely controlling a home network server associated with the household appliances of the home network.

It is still another object of the present invention is to provide an intelligent access authentication system and method which is capable of reporting information on any visit, door opening, and any abnormal access or authentication to an authorized user having a handheld terminal and supporting communication between the authorized user and the visitor, even when the authorized user is not home.

In accordance with an aspect of the present invention, the above and other objects can be accomplished by an access authentication system that includes a door phone; a door lock which detects a visitor outside the door and releases the lock when a door lock release command is received; a smart communicator which configures access approval levels of expected visitors and access authentication information for each access approval level, communicates with the visitor, and controls the door lock; and a home network server which stores the access approval levels of expected visitors and access authentication information for each access approval level received from the smart communicator, checks an access approval level of a visitor attempting to release the door lock by referring to previously stored information, and transmits a door lock relief command to the door lock according to the access approval level of the visitor.

Preferably, the home network server transmits the information on the visitor to the smart communicator when the visitor denied access, and establishes a communication with the visitor through the door phone and releases the door lock (when the visitor is authorized) under control of the smart communicator.

Preferably, the smart communicator establishes a communication channel with the home network server and supports video communications with the visitor.

Preferably, the access approval levels includes at least one of an always approved level, a reserved visitor level which is for the persons registered before the visit, and a sporadic visitor level which is for the persons expected to visit regularly or irregularly.

Preferably, the smart communicator includes a display which displays operation status information of the smart communicator and the information received from the home network server; a Radio Frequency Identification (RFID) communication part which transmits authentication information for releasing the door lock from the outside of a home; a Wibro communication part which performs remote communication with the home network server at the outside of the home through a predetermined communication network so as to remotely control the home network server to release the door lock; a keypad for entering the access approval levels and access authentication information for each access approval level and commands required for the home network server to release the door lock; an audio processor which processes audio signals generated during the communication with the visitor through the door phone; and a controller which stores the access approval levels and the access authentication information for each access approval level and transmits the door lock relief command to the home network server through the Wibro communication part.

Preferably, the smart communicator further includes a storage which stores at least one of the access approval levels and the access authentication information for each access approval level, the information received from the home network server, and the information generated during the communication with the visitor.

Preferably, the door phone includes a camera which takes image of the visitor and transmits the image to the home network server; a microphone which transmits data corresponding to the visitors voice to the home network server; and a speaker which outputs a resident's voice transmitted from the smart communicator via the home network server.

Preferably, the door lock includes an authentication sensor which detects an attempt of the door lock relief (i.e., detects the attempted opening of the door lock) by the visitor and receives the authentication information for releasing the door lock from the smart communicator; and a lock controller which controls to release the door lock according to whether the home network server approves the door lock relief on the basis of the authentication information received from the authentication sensor.

Preferably, the access authentication system further includes a sensor for sensing status information created by the visitor in the home and a camera for taking one or more images on the basis of the status information and transmitting the one or more images to the home network server, wherein the home network server stores the information collected through the sensor and the camera and/or transmits the information to the smart communicator.

Preferably, the home network server includes a display which displays information on the operations status of the home network server and information relating to the visitor; a local communication part which communicates with the door phone and the door lock and receives the access approval levels, access authentication information for each access approval level, and a door lock relief command corresponding to the visitor; a remote communication part which receives the access approval levels, the access authentication information for each access approval level, and commands for whether to approve the door lock relief by the visitor through Wibro communication with the smart communicator; an audio processor which processes audio signals generated during the communication with the visitor through the door phone; and a controller which determines whether to approve the access authentication of the visitor on the basis of the access approval levels and the access authentication information for each access approval level and releases the door lock according to the command received from the smart communicator.

Preferably, the home network server further includes a storage which stores the access approval levels and the access authentication information for each access approval level, the information collected from the visitor, and the information generated during the communication with the visitor.

In another aspect of the present invention, the above and other objects can be accomplished by an access authentication method. The access authentication method includes a) determining, at a home network server, whether to approve an entry of a visitor when an attempt to release a door lock is detected; b) transmitting information on the visitor to a smart communicator of a resident, when the door lock relief attempt is denied; c) releasing the door lock if a door lock relief command is received from the resident's smart communicator; and d) monitoring the visitor when the resident is not in the home.

Preferably, the method further includes, after step b), transmitting a communication request message to the visitor through the door phone when the communication request message is received from the resident's smart communicator; establishing a Wibro communication channel for bidirectional communication between the resident and the visitor through the resident's smart communicator and the door phone, when a communication response message is input through the door phone; and determining whether a door lock relief command is received from the resident's smart communicator after a video communication between the resident and the visitor through the Wibro communication channel.

Preferably, the method further includes registering the access approval levels of the visitors and the authentication information for each level, after step a); and determining whether to approve the visitor's entry on the basis of the access approval levels of the visitors and the authentication information, in step a).

Preferably, the access approval levels includes at least one of an always approved level, a reserved visitor level which is for the persons registered before the visit, and a sporadic visitor level which is for the persons expected to visit regularly or irregularly.

Preferably, the method further includes checking the access approval level of the visitor on the basis of the access approval levels and the authentication information for each access approval level and determining whether or not to release the door lock for the visitor according to the checking result, if a door lock relief attempt is detected by the visitor.

Preferably, the method further includes approving the door lock relief if the access approval level of the visitor is the always approved level.

Preferably, the step d) includes determining whether the resident is in the home after the door lock relief is approved; and monitoring the visitor when the resident is not in the home.

Preferably, the step of monitoring the visitor includes detecting movement of the visitor and sound created by the visitor; recording at least one of the movement and the sound; and/or transmitting the recorded movement and sound to the resident's smart communicator.

Preferably, the method further includes approving relief of the door lock according to whether the resident is in the home, if the access approval level of the visitor is the reserved visitor level or the sporadic visitor level.

Preferably, the step d) includes storing information collected from the visitor and a content of the bidirectional communication.

Preferably, the method further includes transmitting the stored information to the resident's smart communicator.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 8A to 8B are flowcharts illustrating a warning mode of FIG. 7 in more detail;

DETAILED DESCRIPTION OF THE PREFERRED EMBODIMENTS

Figure 1:
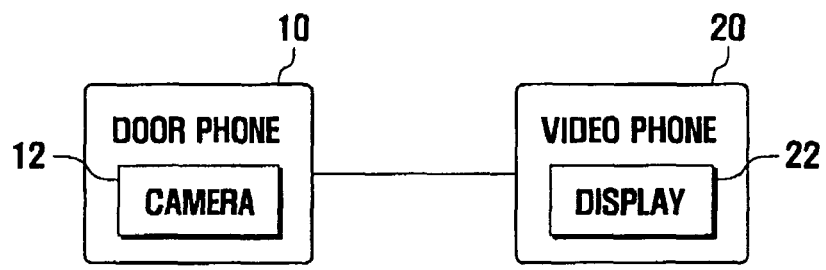
FIG. 1 is a block diagram illustrating a video door phone system as a part of the home automation.
Figure 2:
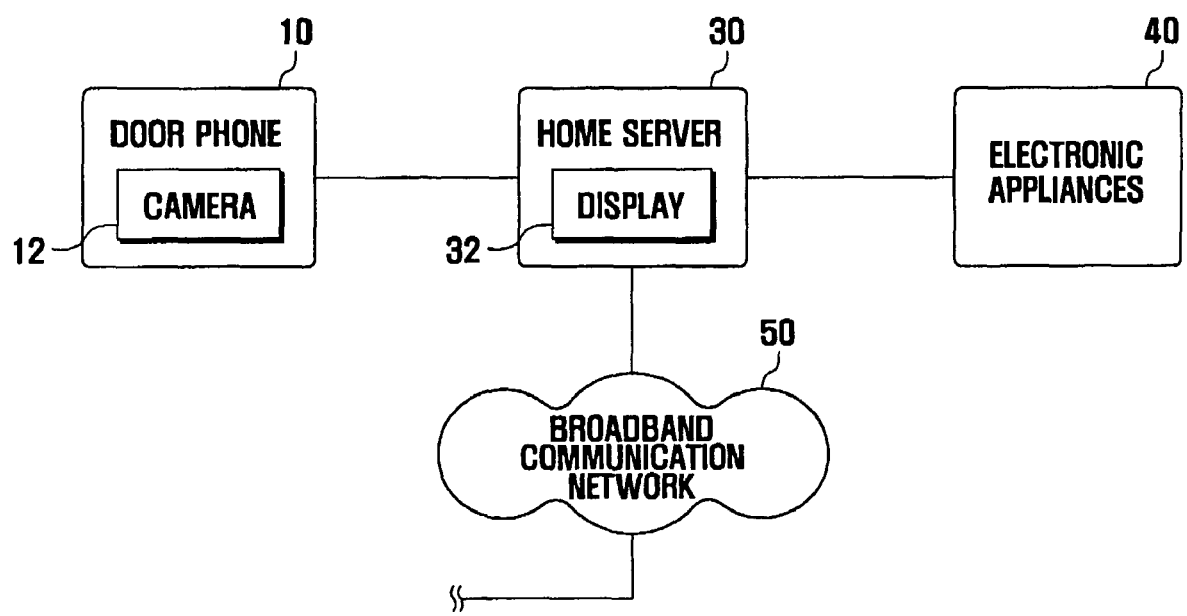
FIG. 2 is a block diagram illustrating a conventional home automation system.

Preferred embodiments of the present invention will be described with reference to the accompanying drawings in detail. Wherever possible, the same reference numbers will be used throughout the drawing(s) to refer to the same or like parts. Detailed descriptions of well-known functions and structures incorporated herein will be omitted when it many obscure the subject matter of the present invention.

Figure 3:
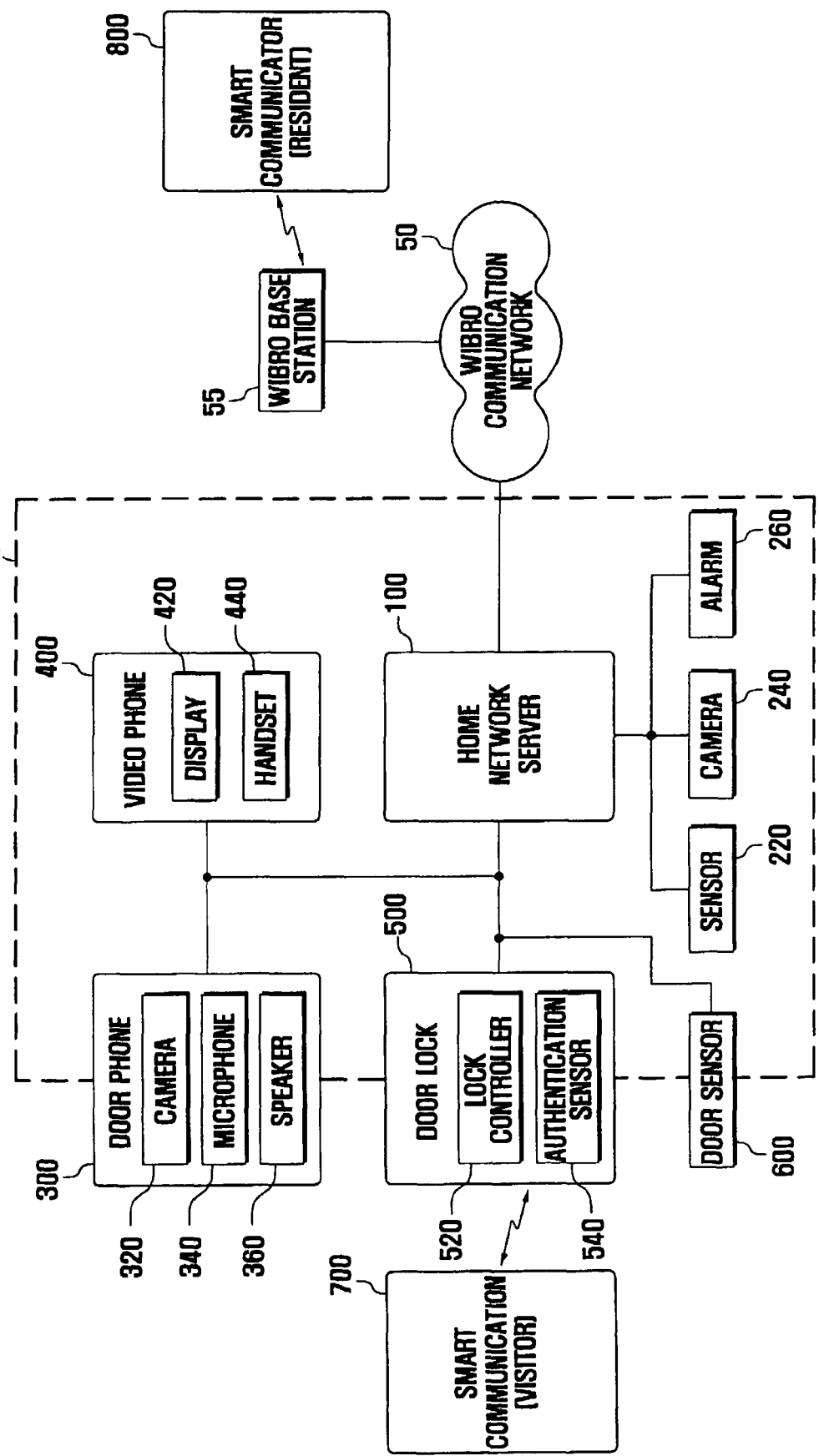
FIG. 3 is a block diagram illustrating an intelligent access authentication system according to the present invention.

FIG. 3 is a block diagram illustrating an intelligent access authentication system according to the present invention.

As shown in FIG. 3, the intelligent access authentication system includes a home network server 100, a sensor 220, a camera 240, an alarm 260, a door phone 300, a video phone 400, a door lock 500, a door sensor 600, and smart communicators (SCs) 700 and 800.

The home network server 100 controls the overall operations of the home network system and performs the operations corresponding to the control command transmitted from the resident's smart communicator 800 at a location that can be inside 70 and outside of the home. Also, the home network server 100 shares data and interoperates with the network devices located inside or outside of the home. That is, the home network server 100 stores information on the visitors collected by the smart communicators (700 and/or 800) or a personal computer (PC) inside and outside of the home. The information of the visitors includes access authentication levels and authentication information determined by the resident. In case that an attempt to open the door with the visitor's smart communicator 700 is made, or contact voice, or movement is detected by the home network server 100, the home network server 100 compares the information provided by the visitor's access attempt with the previously registered access level and authentication information so as to determine to release the door lock 500.

The sensor 220 can include a microphone and a movement detector for detecting sound and movement created by the visitor, and transmits the information on the sound and movement to the home network server 100.

The camera 240 is installed inside the home or at another desired location so as to monitor the outside of the door and transmit the image information to the home network server 100 under the control of the home network server 100. The home network server 100 may adjust the shooting direction of the camera 240 on the basis of the sound and movement information transmitted from the sensor 220.

The alarm 260 selectively outputs an alarming sound under the control of the home network server 100.

The door phone 300 is installed at a predetermined position on the door (or at a location adjacent to a door) so as to face outside and includes the camera 320, the microphone 340, and the speaker 360. The camera 320 takes the image of visitor in front of the door phone 300 and transmits the image to the video phone 400 and/or the home network server 100. The microphone 340 records the sound created by the visitor and transmits the recorded sound to the video phone 400 and the home network server 100. The speaker 360 outputs the sound transmitted from the video phone 400 and/or the home network server 100. The home network server 100 can transmit the image received from the camera 320 and/or the sound recorded the microphone 360 to the resident's smart communicator 800.

The video phone 400 is preferably located at the inside 70 of the home so as to enable the resident inside the home to control the door lock 500 and to communicate with the visitor (using voice and/or video data) using the door phone 300. The video phone 400 has a display 420 and a handset 440. The display 420 displays the image provided by the door phone 300 and the handset 440 transmits and receives voice data to and from the visitor for mutual communication.

The door lock 500 detects a visitor outside the door and is controlled so as to restrict an access of the unauthorized person. The door lock 500 includes a lock controller 520 and an authentication sensor 540. The lock controller 520 controls so as to lock and release the door lock. The lock controller 520 may selectively release the door lock 500 according to a relief command transmitted from the video phone 400 and the home network server and when the visitor is authorized by successful authentication using the visitor's smart communicator 700. The authentication sensor 540 can communicate with the visitor's smart communicator 700 through a wireless local area communication when the visitor approaches the door lock 500, or the authentication sensor 540 can recognize a communication module such as an Identification (IC) chip or a Radio Frequency identification (RFID) tag, when the smart communicator contacts the authentication sensor 540, so as to receive the information for authentication from the visitor's smart communication. Also, the authentication sensor can detect a contact from the outside of the door and the open and close of the door.

The lock controller 520 determines whether to release the lock (e.g., unlock the lock) on the basis of the authentication result received from the authentication sensor 540 and transmits the determination result to the home network server 100. Also, the lock controller 520 transmits the access denial information to the home network server 100 when the access is denied with the authentication information for releasing the lock. Also, the lock controller 520 transmits the approach information of the visitor detected through the door sensor 600 to the home network server 100. At this time, the home network server 100 controls such that the camera 320 takes the image of the person approaching the door and the door phone 300 transmits the image taken by the camera 320 to the home network server 100.

The smart communicators 700 and 800 may have an identical structure for both the visitor and the resident, respectively. Accordingly, for the sake of clarity, only a structure of the resident's smart communicator 800 will be explained with reference to FIG. 5 in detail.

The resident's smart communicator 800 is provided with a remote control function for controlling the operation of the home network server 100 through a predetermined communication network at the inside or the outside of the home and supports bidirectional communication with the home network server. The smart communicator 800 can communicate with the home network server 100 through a wireless data communication network, e.g., through a wireless broadband (WiBro) communication network and WiBro base stations. Accordingly, the smart communicator 800 can wirelessly transmit control commands and voice and/or image data to the home network appliances and the home network server 100.

The smart communicator 800 can include a mobile terminal supporting a mobile Internet connection as well as wireless voice and video communication and can control and/or monitor the home network appliances remotely in real time via the home network server 100.

The smart communicator 800 may include means for operating with WiBro, ZIGBEE, RFID, global positioning system (GPS), etc., communication signals and methods and can provide a user interface for controlling the home network appliances.

The smart communicators 700 and 800 may transmit authentication information for releasing the door lock 500 through the wireless local area network. In this case, if the smart communicator 800 approaches the authentication sensor 540 of the door lock 500, the smart communicator 800 and the authentication sensor 540 can communicate with each other such that the authentication information of the smart communicator 800 is provided to the door lock 500.

In case of attempting to release the door lock 500 by the visitor or the visitor's smart communicator 700, the home network server 100 transmits the information on the door lock release attempt and/or the visitor's information extracted from the visitor's smart communicator 700 to the resident's smart communicator 800 which can be remotely located through the communication network 50.

The door lock release attempt information can be a short message of text and/or voice and may contain an alarm sound. In case that the home network server 100 receives the visitor's information (e.g., from the visitor's smart communicator 800), it determines whether to approve the visitor's access authentication on the basis of previously stored access approval levels and authentication information.

Upon receiving the door release attempt information, the resident's smart communicator 800 transmits the voice and/or video communication request command, input by the resident, to the home network server 100 for attempting to communicate with the visitor.

Upon receiving the communication request command, the home network server 100 transfers the communication request command to the door phone 300 and awaits for a response.

If a response is input and is a communication accept response, the home network server 100 transmits the communication accept response to the resident's smart communicator 800. That is, the home network server 100 establishes a WiBro communication channel between the resident smart communicator 800 and the door phone 300 through the WiBro communication network 50 and a Wiro base station 55. Accordingly, the resident's smart communicator 800 and the door phone 300 enable the resident and the visitor to communicate with each other via the home network server 100.

If a door lock release command is received from the resident's smart communicator 800, the home network server 100 controls the door lock 500 to be released. Once the door is opened, the resident can control the home network server 100 using the resident's smart communicator 800 so as to monitor and record the movement of the visitor. According to the resident's command, the home network server 100 may capture sounds and/or images created by the visitor's movement using the sensor 220 and the camera 240 and stores the sound and image data in a memory (not shown). Also, the home network server 100 can transmit the sound and image data to the resident's smart communicator 800 according to predetermined settings and/or a request from the resident's.

If an unauthorized attempt to gain access such as by forcing the opening of the door lock 500, is detected by the authentication sensor 540 of the door lock 500, the home network server 100 generates and transmits an emergency message to the resident's smart communicator 800 and controls the alarm 260 to generate alarm sound. Additionally, the Home Network Server 100 may alert others (such as the police, etc., as desired via wired or wireless means.

Even when the visitor's access is denied, the resident, may communicate with the visitor, remotely control the door lock to be released, and monitor the movement of the visitor with the sound and image created by the visitor, using the smart communicator 800. Accordingly, the resident can check the visitor's identification and purpose of the visit in real time and controls the door lock on the basis of the result of the checking.

Figure 4:
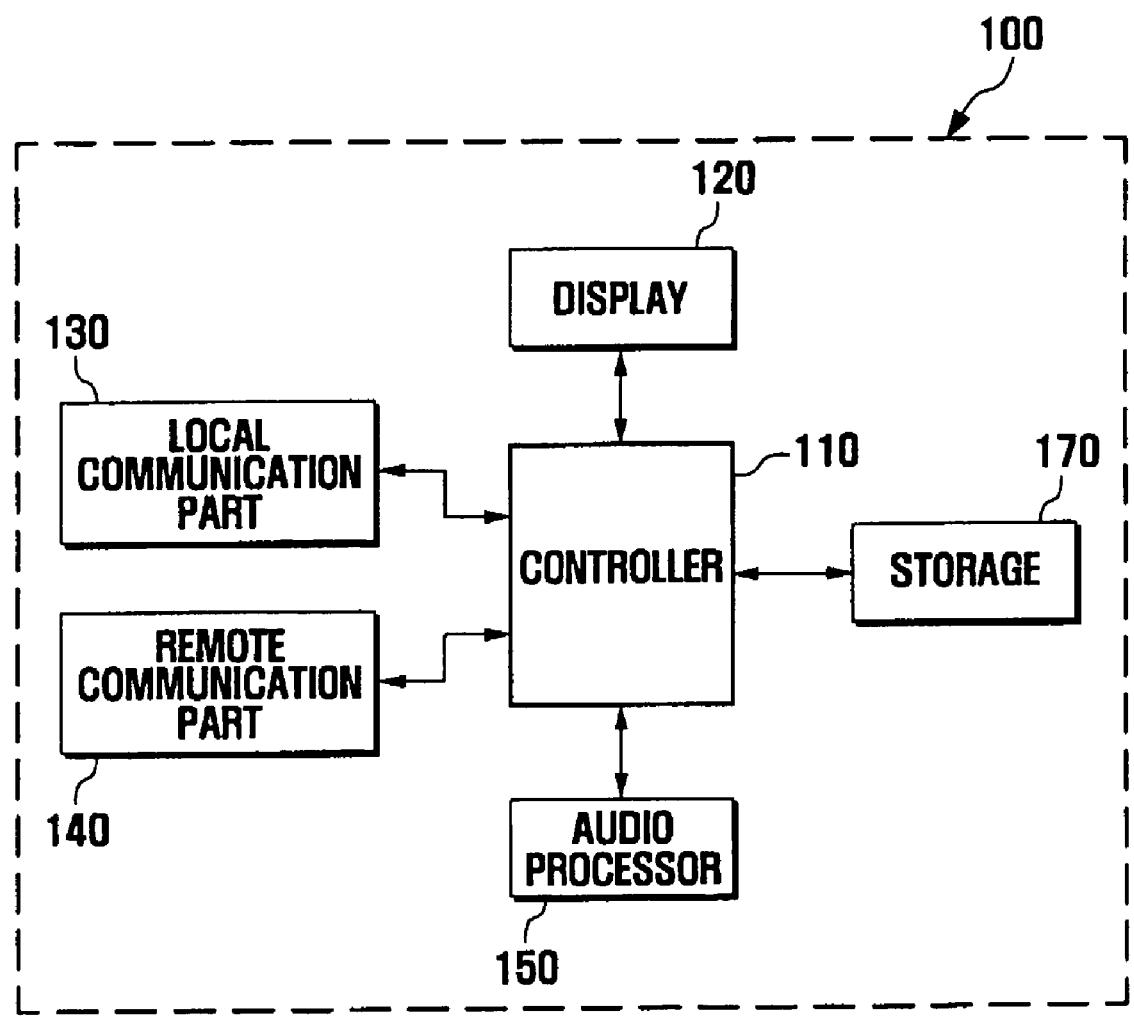
FIG. 4 is a block diagram illustrating the home network server of FIG. 3 according to the present invention.

FIG. 4 is a detailed block diagram illustrating the home network server of FIG. 3 according to the present invention.

As shown in FIG. 4, the home network server 100 includes a controller 110, a display 120, a local communication part 130, a remote communication part 140, an audio processor 150, and a storage access 170.

The controller 110 controls the overall operation of the home network server and the operations of the electric appliances associated with the home network server 100, i.e., the door phone 300, the door lock 500, the door sensor 600, the sensor 220, the camera 240, and the alarm 260.

The display 120 displays the operational status of the home network server 120. Also, the display 120 can display information transmitted from the electric appliances connected through the home network. The display 120 may also display approved access level and authentication information of the information devices and/or the visitor collected by the door phone 300 and the door lock 500.

The local communication part 130 is provided with a wired and/or wireless local communication function so as to communicate with the resident's smart communicator 800 and the electric appliances including the door phone 300 and the door lock for managing the home network. The local communication part 130 can include a function for communicating with the resident's smart communicator 800 and one or more electric appliances in the home.

The remote control part 140 can communicate with the resident's smart communicator 800 through the WiBro communication network 50 and the WiBro base station 55. The audio processor 150 converts the voice signal received from the door phone 300 into digital signal and the digital voice signals received from the resident's smart communicator 800 into analog signal. The controller 110 transmits the converted digital voice signal to the resident's smart communicator 800 through the WiBro communication network 50 and transmits the converted analog voice signal from the resident's smart communicator 800 to the door phone 300.

The storage 170 stores the programs required for the home networking operation of the home network server 100 and various information required for controlling the door lock. Also, the storage 170 stores the information corresponding to voice and image data taken by the sensor 220 and the camera 240, respectively. Also, the storage 170 stores the information on the home network settings, configured by the user, for internetworking the electric appliances. Furthermore, the storage 170 stores the information on the visitors previously provided through the resident's smart communication 800 or other terminal at the inside and/or outside of the home.

The controller 110 controls so as to store information on the access approval levels and the access authentication by level into the storage 170 according to the command inputted through the resident's smart communicator 800 and/or other terminal at the inside and/or outside of the home.

The access approval levels can be classified into the always approved level, reserved visitor level which is for the persons registered before the visit, a sporadic visitor level which is for the person expected to visit regularly or irregularly. The sporadic visitor is a person who visits on a specific date and time and contacts the door having the door lock 500 and the door phone 300 and is required to communicate with the resident at any time but does not enter. The controller 110 can classify the information on the sporadic visitors according to the visit schedules and store the information into the storage 170.

In the embodiment, access approval levels are exemplary classified into the resident, registered visitor, and the sporadic visitor, however, the classification is not limited to these classes but can be defined in other manner in consideration of the range of the approvals. The access approval levels and authentication information can be registered by the resident and/or the persons approved to access anytime.

Table 1 is an example of the authentication information by access approval levels according to the present invention.

TABLE 1

| Class | Name | RFID | Phone Number |
|---|---|---|---|
| Resident | HONG Kil-Dong | X | 010-9900-00XX |
| | HONG Choon Hyang | X | 010-9900-00XX |
| | . | . | . |
| Registered Visitor | A | X | 010-1234-111X |
| | B | X | 010-1234-00XX |
| | C | X | 010-1235-XXXX |
| Sporadic Visitor | A1 | ZZZZZ | 010-1255-000X |
| | A2 | ZZZZ8 | X |
| | . | . | . |

The resident, who can always enter the home, registers the RFID tag of the smart communicator 800 through an RFID reader (not shown) provided at the home network server or registers the authentication information to the home network server 100 by registering the call number of the resident's smart communicator through the smart communicator 800 itself and the personal computer.

Also, the resident can register the authentication on the reserved visitor by registering the phone number of the visitor's smart communicator through the resident's smart communicator 800 or the PC at the inside and/or outside of the home. The authentication information on the sporadic visitor can be registered, as in the reserved visitor authentication information registration, with business information as well as the phone number.

Figure 5:
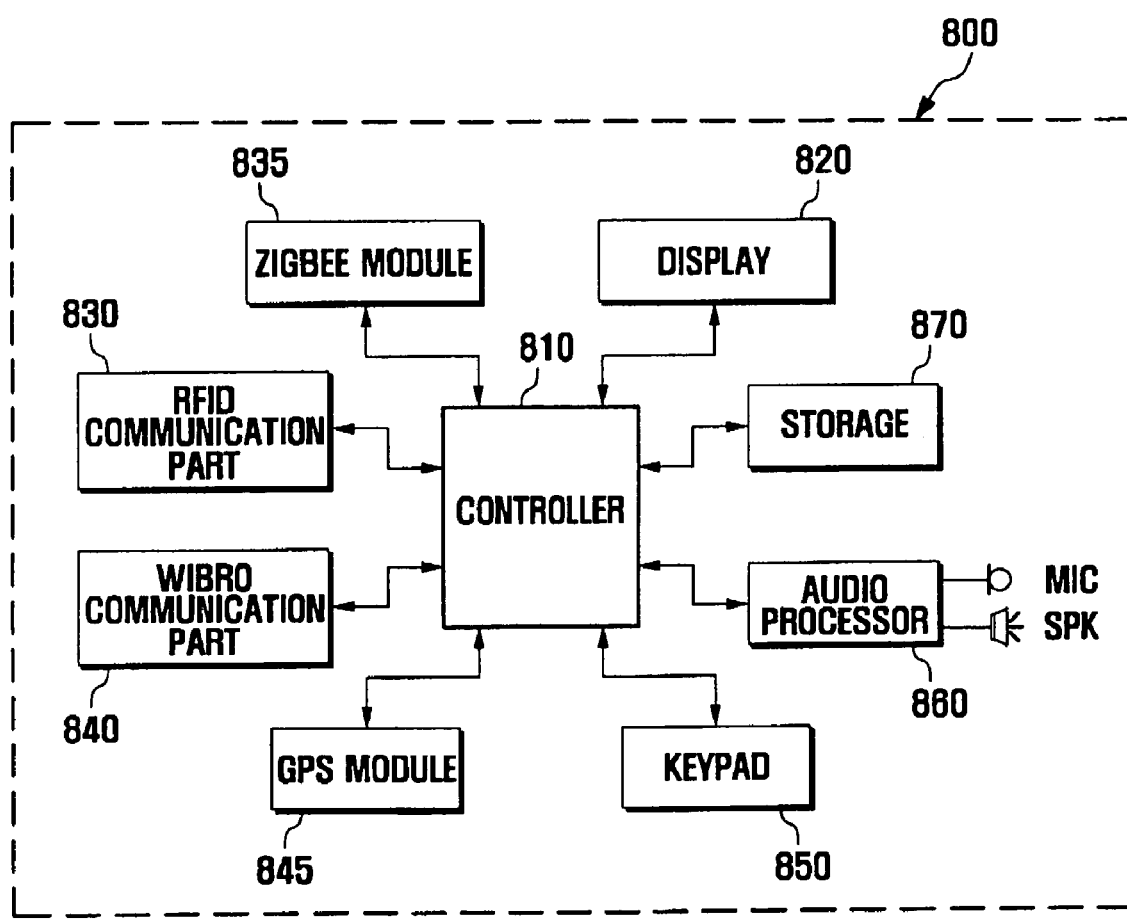
FIG. 5 is a block diagram illustrating the smart communicator of FIG. 3 according to the present invention.

FIG. 5 is a block diagram illustrating the smart communicator of FIG. 3 according to the present invention.

As shown in FIG. 5, the smart communicator 800 includes a controller 810, a display 820, an RFID communication part (830), a ZIGBEE module (835), a WiBro communication part 840, a GPS module 845, a keypad 850, an audio processor 860, and a storage 870.

The controller 810 controls the overall operation of the smart communicator 800 and remotely controls the operation of the home network server 100.

The display 820 displays the operation status of the smart communicator and image received from the home network server 100.

The RFID communication part 830 can transmit the door lock authentication information (RFID information in this embodiment) to the authentication sensor 540 of the door lock 500 and provide the home network server 100 with various information on the smart communicator 800 directly or through the local wireless communication module. Here, the local wireless communication module can be a ZIGBEE module 835 or the Bluetooth module (not shown).

The ZIGBEE module 835 provides the local wireless communication function for the home automation and the data communication.

The WiBro communication part 840 provides the mobile Internet access and bidirectional communication with the home network server 100 at the outside of the home through the WiBro communication network 50. The WiBro communication part 840 can receive the control commands and/or short messages transmitted from the home network server 100, and can exchange and analyze the operation status information generated by executing the control commands of the home network server. Also, the WiBro communication part 840 can be optionally implemented so as to process the cellular communication protocols.

The GPS module 845 determines the location of the user on the basis of the coordinate information received from one or more GPS satellites.

The keypad 850 is used to for input control commands to the controller 810 for controlling the operation of the smart communicator 800 and includes a plurality of keys to input commands for remotely controlling the operation of the home network server 100.

The audio processor 860 converts the analog audio signals input from the microphone into the digital signals and converts the digital audio signals into the analog signals to output through the speaker. In this embodiment, the audio processor 860 outputs the voice of the visitor received from the home network server 100 and transmits the resident's voice to the home network server 100 through the remote communication part 840 after converting into digital signals, so as to support the bidirectional communication. The audio signal is processed and transmitted to the home network server 100 is performed under the control of the controller 810. The audio processor 860 can include a coder/decoder CODEC.

The storage 870 stores the programs required for operating the smart communicator 800 and settings for operating the home network server 100. Also, the storage 840 can store the content of the communication with the visitor and the status information on the home network appliances received from the home network server 100. The storage 870 can include a ROM, RAM, flash memory, hard disc, networked memory, etc., as required.

Figure 6:
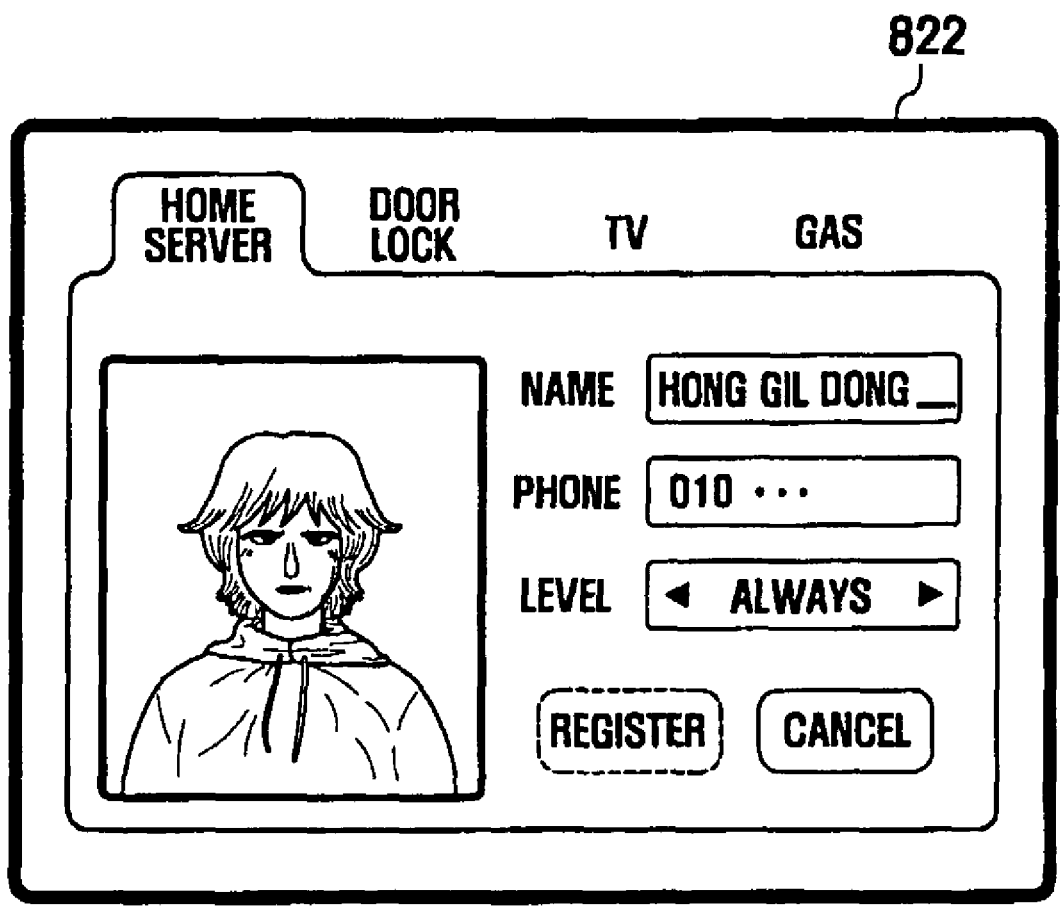
FIG. 6 is a screen shot illustrating a display screen for registering access approval levels by visitor and access authentication information by level.

FIG. 6 is a screen shot illustrating a screen for registering access approval levels by visitor and access authentication information by level.

As illustrated in FIG. 6, a registration screen 822 of the smart communicator 800 shows a photograph, name, and phone number of the visitor, and menus for selecting the access approval level, registering, and canceling the registration. The access approval levels can be classified into the always approved resident, registered visitor who is previously registered by the resident before visitation, sporadic visitor who is expected to visit periodically or non-periodically. The registered visitor and sporadic visitor will be called by a temporary approved visitor.

In case that the basic information such the photograph, name, and phone number of the visitor is previously stored in the smart communicator 800, the resident can register the visitor only by selecting the buttons for the access approval level, registration, and cancel. However, if the basic information is not stored in the smart communicator 800, the resident registers the visitor by selectively inputting the basic information item by item, selecting the access approval level, and pushing the registration button. It is preferred to input the minimum basic information required for recognizing the visitor.

The smart communicator 800 stores the access approval level by visitor and the access authentication information of each level in its storage 870 and transmits the same to the home network server 100 so as to store in the storage 170 of the home network server.

Figure 7:
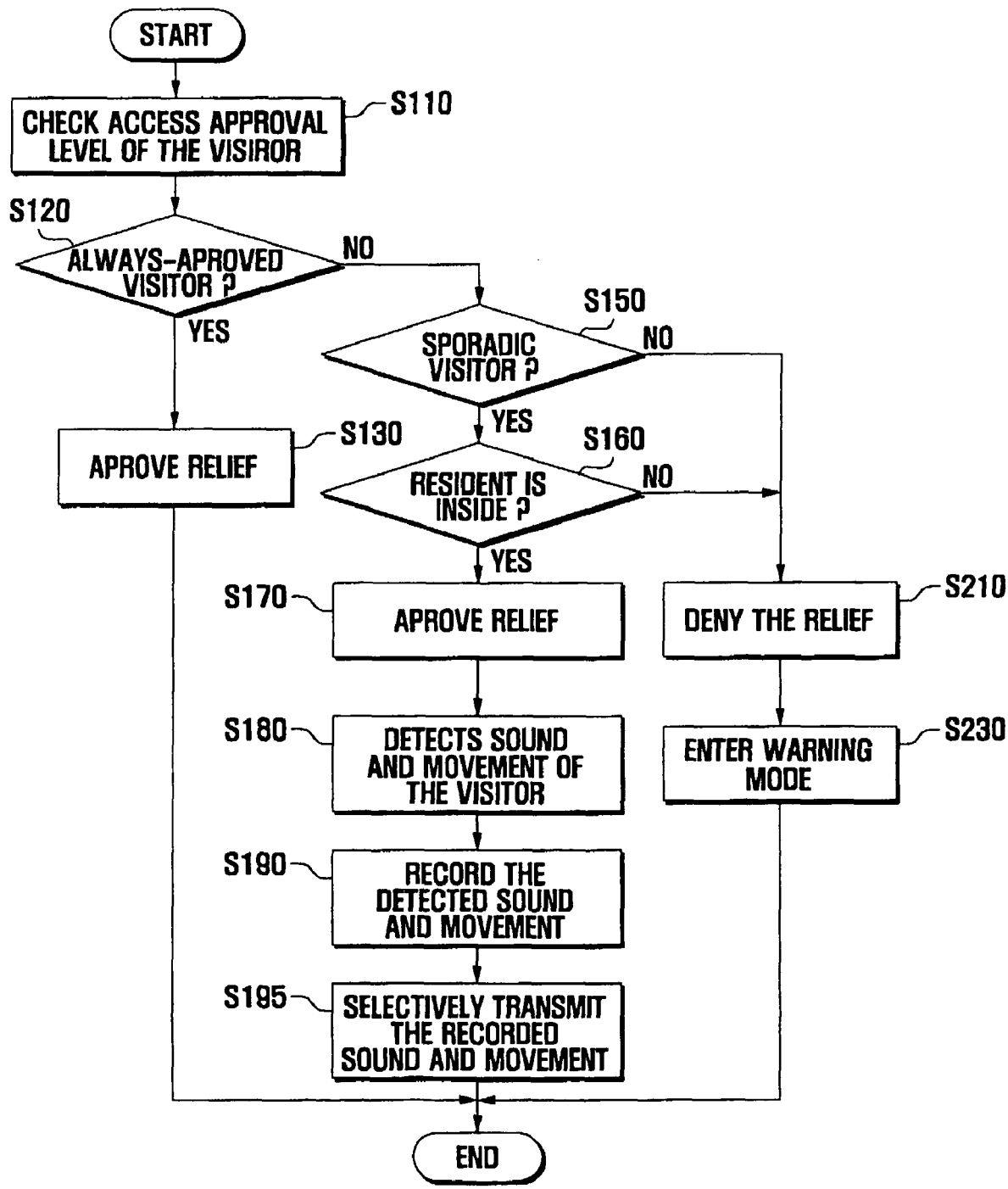
FIG. 7 is a flowchart illustrating an access authentication method of the intelligent access authentication system using a smart communicator, according to the present invention.

FIG. 7 is a flowchart illustrating an access authentication method of the intelligent access authentication system using a smart communicator, according to the present invention.

When a visitor attempts to release the door lock 500, the home network server 100 checks the access approval level of the visitor with reference to access approval level by visitor and the access authentication information for each level stored in the storage 170 at step S110. Here, the home network server 100 checks the access approval levels in a sequential priority order and the always approved user has the highest priority. Sequentially, the home network server 100 determines whether the visitor is one of the always approved persons at step S120 and then approves the relief of the door lock if it is determined that the visitor is the always approved person at step S130. The home network server 100 controls the door lock 500 to be released and then reports the door lock relief to the resident's smart communicator 800.

On the other hand, if it is determined that the visitor is not the always approved person at step S120, the home network server 100 determines whether the visitor is a temporary approved visitor, i.e., a registered visitor or a sporadic visitor at step S150. If it is determined that the visitor is the temporary approved visitor, the home network 100 determines whether the resident is in the house at step S160. At this time, the home network server 100 can determine whether the resident is in the house using the GPS module 845 of the smart communicator 800 or based on whether there is the local wireless communication with the smart communicator 800. The home network server 10 may also use any other sensors such as a proximity sensor and a motion sensor so as to determine whether the resident is in the house. If the resident is in the house, the home network server 100 approves the relief of the door lock at step 170 and terminates the access authentication procedure.

If the resident is in the home and the temporary approved visitor is approved, the home network server 100 enters a monitoring mode at steps S180-S195. That is, the home network server 100 controls such that the sensor 220 detects the sound and the movement created by the visitor at step S180, the microphone records the sound, the camera takes one or more pictures (e.g., still and/or motion pictures), and the sound and the one or more pictures (or the motion pictures) are stored into the memory at step S190. The home network server 100 can transmit the recorded sound and the one or more pictures (or motion pictures) to the resident's smart communicator 800 and/or other exterior devices according to a preset mode or a request from the resident's smart communicator 800 at step S195.

If it is determined that the visitor is not the temporary approved visitor at step S150 or if it is determined that the resident is not in the home even though the visitor is the temporary approved visitor at step S160, the home network server 100 denies the relief of the door lock at step S210 and then enters a warning mode at step S230. The warning mode will be described in FIGS. 8A to 8B in more detail.

As described above, the home network server 100 determines the access approval level of the visitor referring to the previously stored visitor's information and releases the door lock on the basis of the determination, and then selectively enters the monitoring mode for monitoring the visitor entered into the home, such that it is possible to selectively approve the access of the visitor on the basis of the access approval levels and to monitor the visitor based on whether the resident is in the home.

Figure 8B:
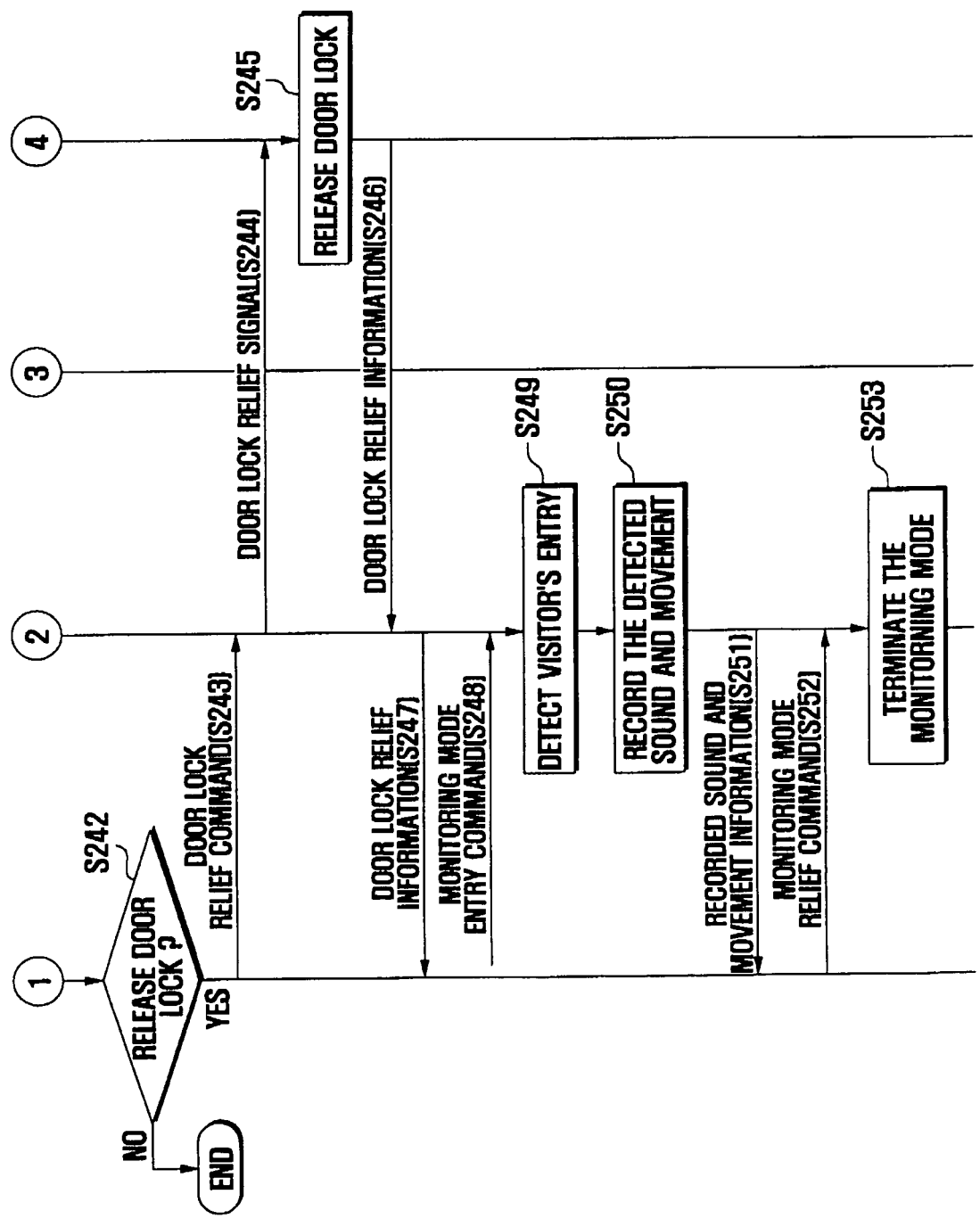

FIGS. 8A to 8B are flowcharts illustrating the warning mode operations of FIG. 7 in more detail.

The door lock 500 detects an attempt for releasing the door lock and transmits information on the approach of a visitor who is not approved for releasing the door lock to the home network server 100 (at step S231). At this time, the door phone 300 transmits the image of the visitor taken by the camera to the home network server 100 at step S232. Also, the home network server 100 transmits the visitor's approach information and the visitor's image to the resident's smart communicator 800 at step S233.

The resident's smart communicator 800 displays the visitor's approach information and the visitor's image received from the home network server 100 on a display and awaits a command input for whether to communicate with the visitor at step S234. If there is a command input requesting communication with the visitor, the resident's smart communicator 800 transmits the communication request to the home network server 100 at step S235.

The home network server 100 transmits information requesting for communication to the door phone 300 according to the communication request signal received from the resident's smart communication at step S236. Upon receiving the communication request information, the door phone 300 awaits a response command of the visitor. If there is an input of the response command, the door phone transmits the communication response information to the home network server at step S237.

The home network server 100 transmits the communication response information received from the door phone 300 to the resident's smart communicator 800 at step S238. At this time, the resident's smart communicator 800 determines whether the communication response information is communication acceptance information at step S239. If it is determined that the communication response information is the communication acceptance information, the resident's smart communicator 800 awaits an input of acknowledgement command and establish a WiBro communication channel with the home network server 100 upon the acknowledgement command being inputted, at step S240. Through the WiBro communication channel established between resident's smart communicator 800 and the door phone 300 via the home network server 100, the resident and the visitor can bidirectionally communicate using the WiBro video communication at step S241.

If there is no command input for communication with the visitor at step S234 or if the communication response information is not the communication acceptance information at step S239, or according to the result of the WiBro video communication, the smart communicator determines whether there is a command for releasing the door lock at step S242. If the door lock relief command is input, the resident's smart communicator transmits the door lock relief command to the home network server 100 at step S243.

Upon receiving the door lock relief command form the resident's smart communicator 800, the home network server 100 transmit a door lock relief signal corresponding to the door relief command to the door lock 500 at step S244. Upon receiving the door lock relief signal, the door lock 500 releases the lock at step S245 and transmits a door lock relief information for informing the relief of the door lock to the home network server at step S246. Sequentially, the home network server 100 transmits the door lock relief information to the resident's smart communicator 800 at step S247.

If the monitoring mode entry command is input after the door lock is released, the resident's smart communicator 800 transmits the monitoring mode entry command to the home network server 100 at step S248. Upon receiving the monitoring mode entry command, the home network server 100 enters the monitoring mode so as to detect the sound and movement of the visitor at step S249.

At this time, the home network server 100 records the visitor's sound using the microphone, takes the visitor's motion picture using the camera 240, and stores the sound and the motion picture at step S250. The home network server 100 the stored sound and motion picture information to the resident's smart communicator 800 and/or other exterior devices according to the predetermined mode or the request from the resident's smart communicator 800 at step S251.

In the meantime, if a monitoring mode relief command is input, the resident's smart communicator 800 transmits the monitoring mode relief command to the home network server 100 at step S252. Upon receiving the monitoring mode relief command, the home network server 100 terminates the monitoring mode at step S253.

When the door lock relief is denied, the home network server performs bidirectional communication with the resident located in a remote place using the smart communicator 800, releases the door lock according to the remote control of the resident's smart communicator 800 on the basis of the communication result, transmits the motions picture of the visitor to the resident's smart communicator 800, such that the resident can check the visitor's identification and purpose of the visit through the smart communicator 800 accurately in real time.

Figure 9A:
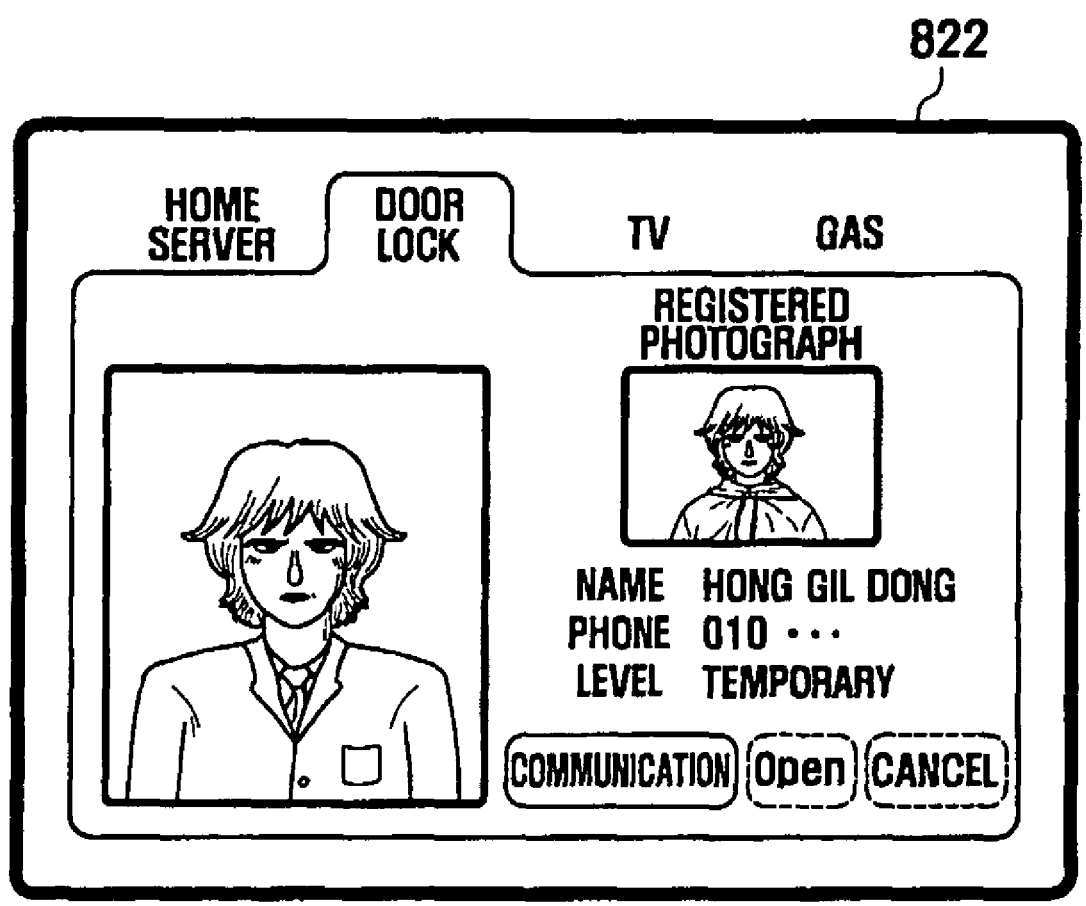
FIG. 9A is a screen shot illustrating a display screen of the smart communicator displaying a visitor's information and image received from the home network server.
Figure 9B:
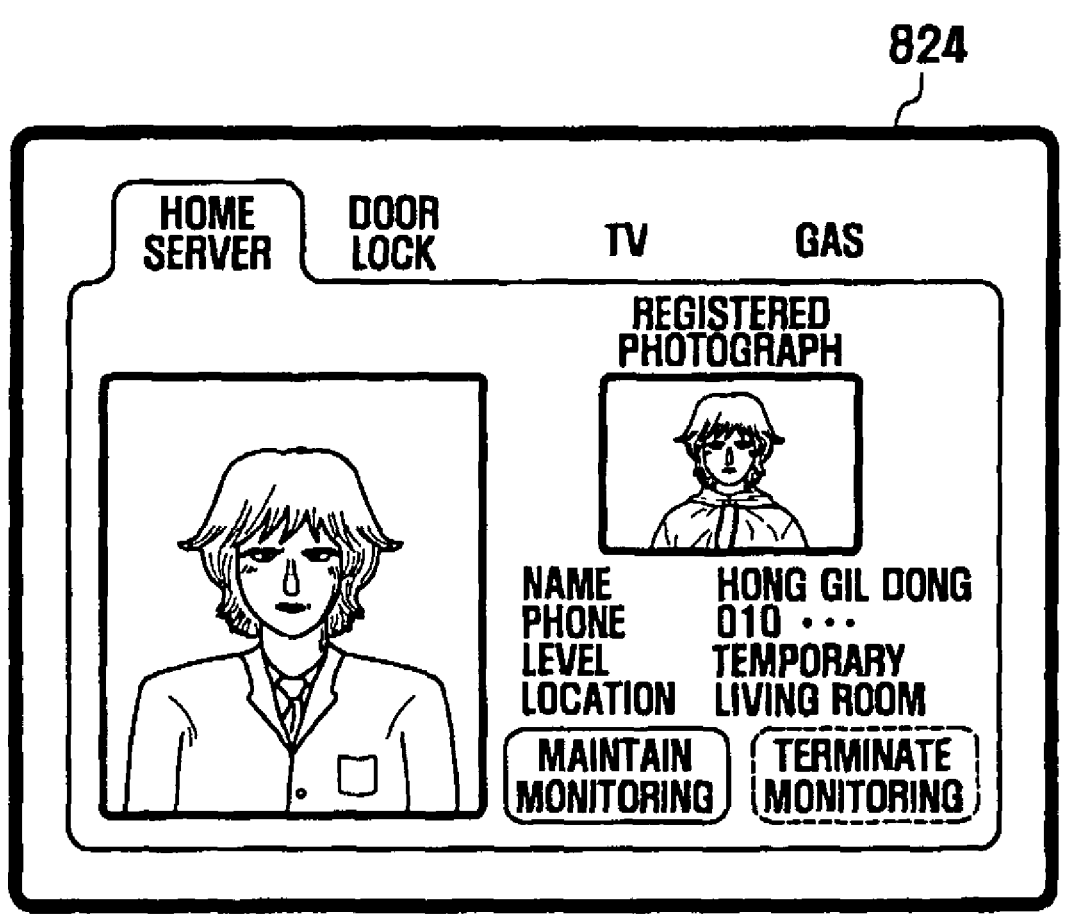
FIG. 9B is screen shot illustrating the screen of the smart communicator displaying an image taken by the camera which is received from the home network server.

FIG. 9A and FIG. 9B are screen shots illustrating screens displaying the visitor's information received from the home network server in the warning mode.

FIG. 9A is a screen shot illustrating the screen of the smart communicator displaying the visitor's information and image received from the home network server.

As shown in FIG. 9A, the screen 822 of the smart communicator 800 displays the visitor's basic information and image received from the home network server 100 and the registered access approval level and access authentication information. The registered access authentication information can include a photograph, name, phone number, and the like.

The screen shows the access approval level of the visitor is the temporary approved visitor Accordingly, the screen shows some menu buttons for determining whether to attempt to communicate with the visitor, releasing the door lock, and denying the relief of the door lock.

FIG. 9B is screen shot illustrating the screen of the smart communicator displaying the image taken by the camera with the recorded sound, which are received from the home network server.

As shown in FIG. 9B, the screen 833 of the smart communicator 800 displays the image taken by the camera with the sound recorded at the same time and some menu buttons for continuing or terminating the warning mode. The received sound data is replayed via a speaker (not shown).

As described above, the access authentication system and method of the present invention determines an access approval level of a visitor with reference to the previously stored information on the visitor, determines whether to release the door lock on the basis of the determination, and enters the monitoring mode according to the resident's location if the door lock is released, such that it is possible to selectively allow the visitor to enter the home and monitor the movement of the visitor when the resident is not in the home.

Also, the access authentication system and method of the present invention performs, when the relief of the door lock is denied, the bidirectional communication between the visitor and the resident located at a remote place, determines whether to release the door lock on the basis of the communication result, releases the door lock according to the door lock relief command received from the resident's smart communicator, and takes the visitor's image and sound, such that the resident can check the visitor's identification and the purpose of the visit accurately in real time and control the door lock at the remote place.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An access authentication system for a home, comprising:
    a door phone;
    a door lock for detecting a visitor outside the door and releasing a lock when a door lock release command is received;
    a video phone for communicating with the visitor and for controlling the door lock, wherein the video phone is located inside the home;
    a smart communicator for configuring access approval levels of expected visitors and access authentication information for each access approval level, communicating with the visitor, and controlling the door lock; and a home network server for storing the access approval levels of expected visitors and access authentication information for each access approval level received from the smart communicator, checking the access approval level of the visitor attempting to release the door lock by comparing access authentication information of the visitor with previously stored access authentication information, and transmitting a door lock relief command to the door lock according to the access approval level of the visitor, determining whether a resident is located in the home when the door lock relief is approved, and monitoring the visitor when it is determined that the resident is not located in the home, wherein the home network server remotely communicates with the smart communicator, and transmits information on door lock release attempts to the smart communicator when the door lock release is attempted by the visitor and the smart communicator remotely establishes a communication channel with the door phone connected to the home network server.

2. The system of claim 1, wherein the home network server transmits the information on the visitor to the smart communicator when the visitor is an access denied person, and establishes a communication with the visitor through the door phone and releases the door lock under control of the smart communicator.

3. The system of claim 2, wherein the smart communicator establishes a communication channel with the home network server and supports video communication with the visitor.

4. The system of claim 1, wherein the access approval levels includes at least one of an always approved level, a reserved visitor level which is for the persons registered before the visit, and a sporadic visitor level which is for the persons expected to visit regularly or irregularly.

5. The system of claim 1, wherein the smart communicator comprises:
a display for displaying operation status information of the smart communicator and information received from the home network server;
an RFID (radio frequency identification) communication part for transmitting authentication information for releasing the door lock;
a WiBro (Wireless Broadband) communication part for performing a remote communication with the home network server through a predetermined communication network so as to remotely control the home network server to release the door lock;
a keypad for inputting the access approval levels and access authentication information for each access approval level and commands required for the home network server to release the door lock;
an audio processor for processing audio signals generated during a communication with the visitor through the door phone;
a storage for storing the access approval levels and the access authentication information for each access approval level; and
a controller for transmitting the door lock relief command to the home network server through the WiBro communication part.

6. The system of claim 5, wherein the smart communicator further comprises a storage means for storing at least one of the access approval levels and the access authentication information for each access approval level, the information received from the home network server, and the information generated during the communication with the visitor.

7. The system of claim 1, wherein the door phone comprises:
a camera for capturing an image of the visitor and transmitting the image to the home network server;
a microphone for receiving an audible input corresponding to the visitor and transmitting the audible input to the home network server; and
a speaker for reproducing transmitted from the smart communicator via the home network server.

8. The system of claim 1, wherein the door lock comprises:
an authentication sensor for detecting a door lock relief attempt from the visitor and receiving the authentication information for releasing the door lock from the smart communicator; and
a lock controller for controlling a release the door lock according to whether the home network server approves the door lock relief on the basis of the authentication information received from the authentication sensor.

9. The system of claim 1 further comprising:
a sensor for sensing status information created by the visitor in the home; and
a camera for capturing one or more images on the basis of the status information and transmitting the one or more images to the home network server,
wherein the home network server stores the information collected through at least one of the sensor and the camera and transmits the information to the smart communicator.

10. The system of claim 1, wherein the home network server comprises:
a display for displaying information corresponding to on the operational status of the home network server and the visitor;
a local communication part for communicating with the door phone and the door lock and receiving the access approval levels, access authentication information for each access approval level, and the command for whether to approve the door lock relief by the visitor;
a remote communication part for receiving the access approval levels, the access authentication information for each access approval level, and commands for whether to approve a door lock relief through a WiBro (Wireless Broadband) communication with the smart communicator;
an audio processor for processing audio signals generated during the communication with the visitor through the door phone; and
a controller for determining whether to approve an access authentication of the visitor on the basis of the access approval levels and the access authentication information for each access approval level and releasing the door lock according to a command received from the smart communicator.

11. The system of claim 10, wherein the home network server further comprising a storage means for storing the access approval levels and the access authentication information for each access approval level, the information collected from the visitor, and the information generated during the communication with the visitor.

12. An access authentication method comprising:
a) determining, by a home network server, whether to approve an entry of a visitor to a home, when an attempt to release a door lock is detected;
b) establishing a remote communication channel with a smart communicator which is remotely located from the home network server, when the attempt to release the door lock is denied by the home network server;

c) transmitting information on the visitor to the smart communicator;
d) releasing the door lock if a door lock relief command is received from the smart communicator;
e) determining whether a resident is located in the home, after the door lock relief is approved; and
f) monitoring the visitor, when it is determined that the resident is not located in the home,
wherein the home network server checks the access approval level of the visitor by comparing access authentication information of the visitor with previously stored access authentication information to determine whether to approve entry of the visitor.

13. The method of claim 12 further comprising:
transmitting a communication request message to the visitor through the door phone when the communication request message is received from the smart communicator;
establishing a WiBro (Wireless Broadband) communication channel for bidirectional communication between the resident using the smart communicator and the visitor through the door phone and the smart communicator, when a communication response message is input by the visitor through the door phone; and
determining whether the door lock relief command is received from the smart communicator after communication between the resident and the visitor through the WiBro communication channel.

14. The method of claim 12 further comprising:
registering access approval levels of visitors and authentication information for each of the levels; and
determining whether to approve the entry of the visitor of the plurality of visitors using the access approval levels of the visitors and the authentication information.

15. The method of claim 14, wherein the access approval levels includes at least one of an always approved level, a reserved visitor level corresponding to persons registered prior to a visit, and a sporadic visitor level corresponding to persons expected to visit regularly or irregularly.

16. The method of claim 15 further comprising checking the authentication information for each access approval level and determining whether to release the door lock for the visitor according to the checking result, if a door lock relief attempt is detected by the visitor.

17. The method of claim 16 further comprising approving the door lock relief if the access approval level of the visitor corresponds with the always approved level.

18. The method of claim 12, wherein monitoring the visitor comprises:
detecting movement of the visitor and sound created by the visitor;
recording the movement and the sound; and
transmitting the recorded movement and sound to the smart communicator.

19. The method of claim 16 further comprising approving relief of the door lock according to whether the resident is in the home, if the access approval level of the visitor corresponds with one of the reserved visitor level or the sporadic visitor level.

20. The method of claim 12, wherein monitoring the visitor further comprises storing information generated by the visitor and a content of a bidirectional communication.

21. The method of claim 20 further comprising transmitting the stored information to the smart communicator.

* * * * *